United States Patent [19]

Choi

[11] Patent Number: 5,830,100
[45] Date of Patent: Nov. 3, 1998

[54] VEHICULAR AUTOMATIC TRANSMISSION HAVING FIVE FORWARD SPEED RANGES AND A SINGLE REVERSE SPEED RANGE

[76] Inventor: Hyun-Young Choi, 105-1611, Mido Apt. 940, Soha-dong, Kwangmyong, Kyoungku-do, Rep. of Korea

[21] Appl. No.: 746,888

[22] Filed: Nov. 18, 1996

[30] Foreign Application Priority Data

| Jun. 28, 1996 | [KR] | Rep. of Korea | 96-24999 |
| Jun. 28, 1996 | [KR] | Rep. of Korea | 96-25000 |
| Jun. 28, 1996 | [KR] | Rep. of Korea | 96-25001 |

[51] Int. Cl.⁶ ........................................................ F16H 3/62
[52] U.S. Cl. ............................ 475/276; 475/278; 475/285
[58] Field of Search ........................................ 475/276, 277, 475/278, 284, 285, 288, 289, 292

[56] References Cited

U.S. PATENT DOCUMENTS

| 4,884,471 | 12/1989 | Daggett et al. | 475/285 |
| 4,939,955 | 7/1990 | Sugano | 475/278 |
| 5,213,552 | 5/1993 | Ito | 475/276 |
| 5,261,862 | 11/1993 | Pierce | 475/276 |
| 5,439,088 | 8/1995 | Michioka et al. | 475/276 |

*Primary Examiner*—Charles A. Marmor
*Assistant Examiner*—Sherry Lynn Estremsky

[57] ABSTRACT

An automatic transmission having five forward speed ranges and a single reverse speed range wherein a fluid torque converter connected to a crankshaft of an engine increases the rotary torque of the engine and transferring the increased rotary torque to a planetary gear unit installed next to the fluid torque converter. The planetary gear unit includes: a first, a second and a third planetary gear set; and changes the rotary torque, rotary speed, and rotational direction of the power transferred from the fluid torque converter. Friction elements connect and lock the planetary gear sets to the driven shafts, and are controlled with a hydraulic control system. The hydraulic control system controls the fluid path by a shift lever, according to the speed and load of the vehicle.

4 Claims, 9 Drawing Sheets

VEHICULAR AUTOMATIC TRANSMISSION HAVING FIVE FORWARD SPEED RANGES AND A SINGLE REVERSE SPEED RANGE

FIELD OF THE INVENTION

The present invention relates to an automatic transmission for a vehicle, and more particularly, to the automatic transmission having five forward speed ranges and a single reverse speed range.

PRIOR ART

When starting or accelerating a vehicle, or climbing up a slope, maximum tractive force or maximum torque of the drive wheels is required. The acceleration ability and the climbing ability however significantly decrease when the transmission ratio is below one and therefore, needs to be compensated. More specifically, a planetary gear set is installed between the engine and the drive wheels to convert the torque and the rotary speed of the engine to the level required for the drive wheels. The transmission, therefore, acts to properly convert and transfer the torque and the rotary speed of the engine to the drive wheels. In addition, the transmission idles the engine when the vehicle is stopped, and converts the rotary direction of the drive wheels to reverse.

Such transmissions are generally divided into manual transmissions and automatic transmissions. The manual transmission enables the driver to operate a clutch to drive the vehicle at a required speed suitable for the load condition. The automatic transmission has no clutch control mechanism and is designed so that the driver operates only the acceleration pedal to increase and decrease the traveling speed.

Therefore, the automatic transmission has the advantage in that driving is simple and convenient, and that shocks generated in shifting are small when transferred to the engine or the drive mechanism in contrast to the manual transmission. The automatic transmission is widespread use due to these merits.

The automatic transmission generally includes a the fluid torque converter and the planetary gear unit to easily change between speed ranges with a hydraulic control system according to the drive condition and the load of the engine.

Figure 1:
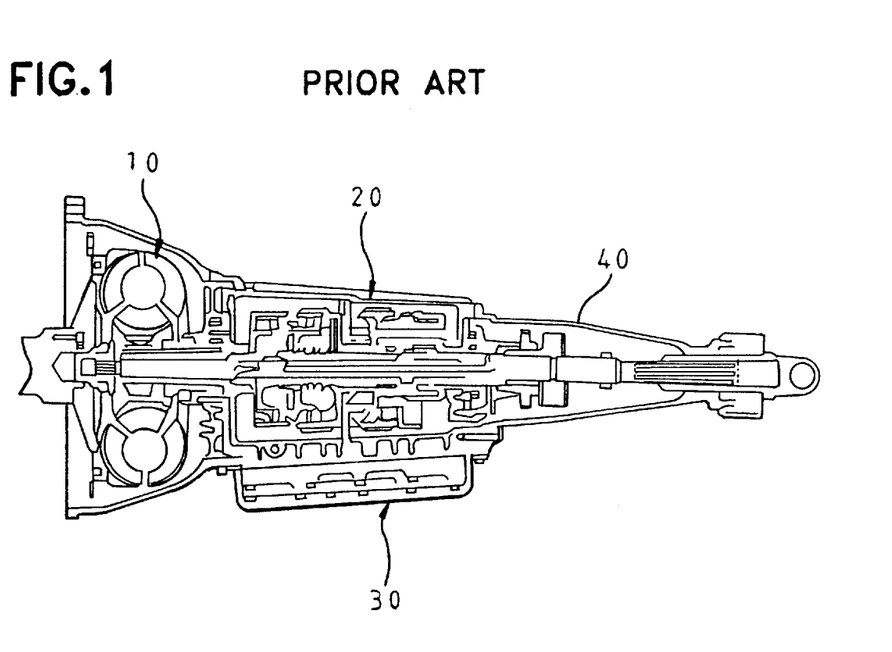
FIG. 1 shows the structure of the conventional four forward speed and single reverse speed automatic transmission according to the prior art.
Figure 2:
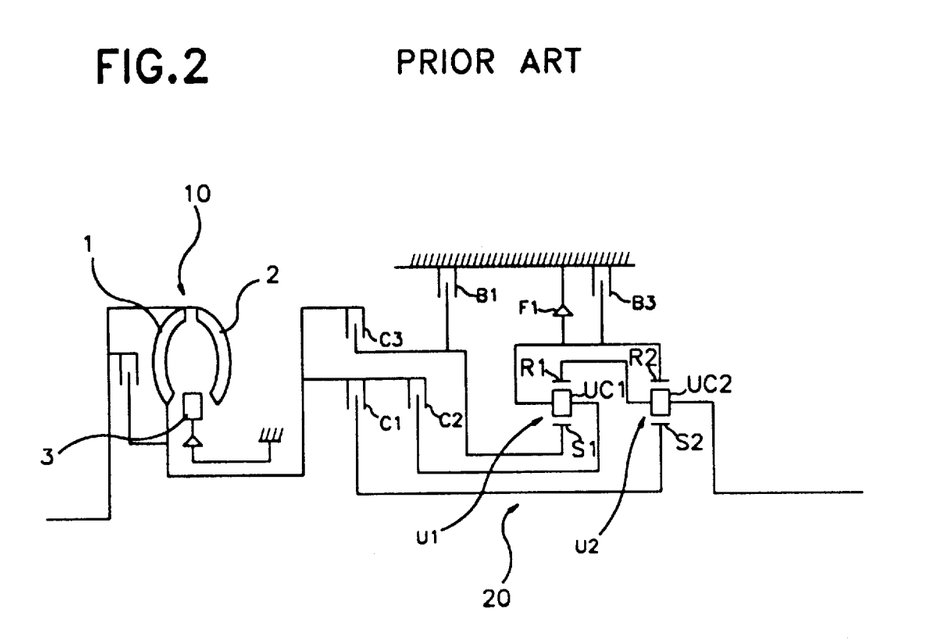
FIG. 2 shows the diagram for explaining the shift states of the four forward speed and a single reverse speed automatic transmission according to the prior art shown in FIG. 1.

The automatic transmission will be explained with reference to FIGS. 1 and 2. FIG. 1 shows the structure of the conventional automatic transmission with four speed ranges. FIG. 2 shows the diagram for explaining the transmission mode of the automatic transmission shown in FIG. 1.

As shown in FIG. 1, the automatic transmission with four speed ranges includes: a fluid torque converter 10 connected to a crankshaft of an engine-which functions as a fluid clutch to increase rotary torque; planetary gear sets 20 installed next to the torque converter and converting the rotary force and speed of the torque converter and changing the rotary direction; a hydraulic control system 30 for controlling a fluid pressure manually or automatically as complying the planetary gear unit with the vehicle speed or the drive condition; a housing 40 enclosing the above components; and a shift lever (not shown) for selecting the mode between parking, reverse, and forward speed ranges.

The fluid torque converter 10, as shown in FIG. 2, includes a pump impeller 1, a turbine 2, and a stator 3. The pump impeller 1 is driven by a crankshaft of the engine. The turbine 2 is installed in an input shaft of the transmission. The stator is installed through an one-way clutch in the housing, and is filled with oil therein.

The planetary gear unit 20 comprises various planetary gear sets. Each of the planetary gear sets includes: a sun gear S; a ring gear R; a planetary carrier UC; friction elements such as clutches C, brakes B; and one-way clutches F for engaging or locking a driving shaft or a driven shaft. The friction elements are operated by the hydraulic control system 30. They drive selectively the sun gear S, the ring gear R, and the planetary carrier UC and they otherwise engage or lock these parts to-the driven shaft. Such operation makes the rotary speed and the rotary force of the engine transferred to the transmission through the fluid torque converter 10 increased and decreased and, if necessary, to change rotational direction. The torque with rotary speed and rotational direction is transferred to a final gear.

The transfer operation according to the vehicle speed and the load condition will be now described in detail.

1. N Range (Neutral)

In this range, none of the friction elements are operated and thus the planetary gear unit which comprises various planetary gear sets, is idle. Each planetary gear set includes a sun gear, a ring gear, and a planetary carrier. The power of the input shaft is not transferred to the output shaft.

2. P Range (Parking)

The operation in this range is the same in function as in the above N range. When a shift lever, however, moves into P range, the outside teeth of an oil distributor are inserted into a parking hole and thus the output shaft is mechanically locked. Furthermore, as the low and reverse brake is operated, a rear planetary carrier is locked.

3. D Range (First Forward Speed Range)

In this range, the first clutch and an one-way clutch are operated. Therefore, the power is transferred to the sun gear of the second planetary gear set. At this time, as a ring is locked by the one-way clutch to prevent it from reversing, the power inputted into the sun gear is transferred to the output shaft through the planetary carrier with a reduction in speed.

4. D Range (Second Forward Speed Range)

In this range, the first clutch C1 and the first brake B1 are operated so that the power transferred to the sun gear S2 of the second planetary gear set U2 (hereinafter referred to as "second sun gear U2") is transferred to the ring gear R1 of the first planetary gear set U1 (hereinafter referred to as "first ring gear R1") through the second planetary carrier UC2 as the second ring gear R2 is idle.

The power transferred through such path is transferred to the second ring gear R1 through the second planetary carrier UC2 with a predetermined reduction in speed as the first sun gear S1 of the first planetary gear set U1 is locked by the first brake B1. In the second planetary gear set U2, the power is inputted through both the second sun gear S2 and the second ring gear R2. The power inputted through such path is transferred to the output shaft through the second planetary carrier UC2. In this range, though this power is transferred with a reduction in speed, the higher speed than in the first range is achieved from the inputted power passing through both he second sun gear S2 and the second ring gear R2.

5. D Range (Third Forward Speed Range)

In this range, the first clutch C1 and the second clutch C2 are operated. Therefore, the power is inputted to both the first planetary carrier UC1 and the second sun gear S2 simultaneously. At this time, the power inputted into the first planetary carrier UC1 are transferred to the second ring gear R2 through the second planetary carrier UC2 because the second sun gear S2 and the second ring gear R2 are idled. As the power is inputted through the second sun gear S2 and the second ring gear R2 in such power transfer process, the power is transferred to the output shaft through the planetary carrier UC2 without any change in speed.

6. D Range (Fourth Forward Speed Range)

In this range, the second clutch C2 and the first brake B1 are operated. Therefore, the power is inputted to the first planetary carrier UC1 and is outputted through the first ring gear R1 with an increase in speed as the first sun gear S1 is locked by the first brake B1. At this time, the power outputted through the first ring gear R1 is transferred to the output shaft through the second planetary carrier UC2. As seen in FIG. 2, as the second sun gear S2 and the second ring gear R2 are idled, the torque with an increasing in speed at the first planetary gear set U1 transferred to the output shaft. Overdrive is thus accomplished.

7. R Range (Reverse Speed Range)

In this range, the reverse clutch C3 and the third brake B3 are operated. Therefore, the power is inputted to the first sun gear S1 of the first planetary gear set U1. At this time, the power inputted to the first sun gear S1 is outputted through the first ring gear R1 in reverse rotational direction with a reduction in speed as the first planetary carrier UC1 is locked by the second brake B2. The outputted power is then transferred to the output shaft through the second planetary carrier UC2. Therefore, in reverse speed, the vehicle is in underdrive.

However, the conventional automatic transmission with four forward speed ranges and a single reverse speed range has one of the chronic problems in that the starting acceleration performance is lowered due to the low starting driving force.

Furthermore, the conventional automatic transmission also has another shortcoming in that shift shock occurs due to discontinuation during shifting between speed ranges and the sudden change in the driving force resulting from the large gap between the shift ranges. The ultimate result is a loss of power and an increase in fuel consumption.

Moreover, as the conventional automatic transmission is limited in that the shifting of only four steps is accomplished, gears of driven reduction gear unit must be made large. Therefore, the conventional automatic transmission has the problem in that vibration and noises of the vehicle are large.

SUMMARY

Therefore, it is an object of the present invention to provide an automatic transmission having five forward speed ranges and a single reverse speed range which can improve the starting driving force by increasing the shift ranges compared with the conventional four-speed transmission.

It is a further object of the present invention to provide an automatic transmission having five forward speed ranges and a single reverse speed range which can accomplish a smooth transmission continuation, and thus having an additional gear ratio compared to the conventional four-speed automatic transmission, resulting in the minimization of the fluctuation in driving force when shifting between gears.

It is a still further object of the present invention to provide an automatic transmission having five forward speed ranges and a single reverse speed range which has a compact structure with a plurality of planetary gear sets.

To accomplish the above objects, the automatic transmission having five forward speed ranges and a single reverse speed range according to the present invention includes: a fluid torque converter connected to a crankshaft of an engine, for acting as a starting clutch and for increasing the torque; a planetary gear unit having a first planetary gear set, a second planetary gear set, and a third planetary gear set equipped sequentially next to a fluid torque converter for changing the torque and the rotational speed and for changing the direction of rotation of the output shaft; friction components for driving the components constituting each planetary gear set of the planetary gear unit and/or connecting them to a driven shaft and fixing them thereto; an oil pressure control until for coinciding the friction elements with the vehicle speed and the driving condition; and a lever for selecting a speed range.

Herein, the third planetary gear set may be constructed so that power is transferred without any change in speed or torque in the third forward speed, fourth forward speed and fifth forward speed ranges, respectively.

The third planetary gear set may also be constructed such that power is transferred without any change in speed or torque in the fourth forward speed and the fifth speed ranges, respectively, and such that power is transferred without any change in speed or torque in the fifth forward speed range only.

The friction elements includes: four clutches for selectively connecting or disconnecting the power flow from a fluid torque converter to each of the planetary gear sets; three brakes for locking any one of components constituting each of planetary gear sets; two one-way clutches for rotating any one component of the planetary gear set in only one predetermined direction.

Of the four clutches, one clutch is equipped so as to connect or disconnect the power flow of the sun gear in the second planetary gear set. A second clutch is equipped so as to connect or disconnect the power flow of the planetary carrier in the first planetary gear set. A third clutch is equipped so as to connect or disconnect the power flow of the first sun gear, and a fourth clutch is equipped so as to connect or disconnect the power flow from the third ring gear to the third sun gear.

Furthermore, a first brake is equipped such that it locks the first sun gear in relation to the housing. A second brake is equipped such that it locks the first planetary carrier in relation to the housing, and a third brake is equipped such that it locks the third sun gear in relation to the housing. Moreover, a first one-way clutch is equipped so that the ring gear in the second planetary gear set may not rotate in the reverse direction. A second one-way clutch is equipped so that the third sun gear does not rotate in the reverse direction.

In the automatic transmission having five forward speed ranges and a single reverse speed range according to the present invention for a vehicle as constructed above, the rotational speed and torque from the engine are increased during passing through the fluid torque converter. With a change in speed or a change in rotational direction, such increased power is transferred through each of the planetary gear sets to the output shaft with friction elements operated by the hydraulic control unit based on vehicle speed, vehicle load, and shift lever operation. At this time, in the case of D range, the power is transferred gradually, with any change in speed and torque from the first forward speed range to the fifth forward speed range. In other words, according to the present invention, the increase of the gear ratio in the first speed range increases the starting driving force, thereby to increase the starting acceleration performance. In addition since shifting is performed from the first forward speed range to the fifth forward speed range a smooth and gradual shift continuation is accomplished. Therefore, the fuel consumption may be decreased, and the shift shock may be also decreased due to more subdivisions in the shifting range. Moreover, with the increased subdivision of the shifting range into five steps, the gear ratio of the driven reduction gear unit may be reduced. Therefore, the vibration and noise of the vehicle which occurs due to the high gear ratio of the driven reduction gear unit may be prevented.

BRIEF DESCRIPTION OF THE DRAWINGS

These and other features, aspects, and advantages of the present invention will become better understood with regard to the following description, appended claims, and accompanying drawings wherein:

FIGS. 3 and 4 show the automatic transmission for a vehicle having the 5-speed ranges according to an embodiment of the present invention, wherein

FIGS. 5 to 10 are diagrams of power flow of the operation of the automatic transmission according to another embodiment of the present invention, wherein

FIGS. 11 to 16 are diagrams of power flow of the operation automatic transmission according to another embodiment of the present invention, wherein FIGS. 17 and 22 are diagrams of power flow of the operation of the automatic transmission according to another embodiment of the present invention, wherein

DESCRIPTION OF THE PREFERRED EMBODIMENTS

Figure 3:
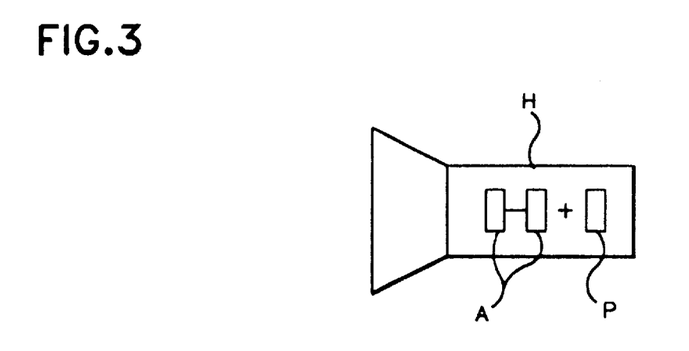
FIG. 3 is the overall drawing of the automatic transmission and FIG. 4 shows the internal structure of the automatic transmission.

As shown in FIG. 3, an automatic transmission having five forward speed ranges and a single reverse speed range is comprised so that a gear shift may be accomplished by combining the third planetary gear set P having a gear ratio of underdrive with the first and second planetary gear sets A which are one of the parts a conventional automatic transmission having four forward speed ranges and a single reverse speed range. The mark H indicates a transmission housing. The third planetary gear set P may be constructed so that power is transferred to the output shaft without any change in speed or torque in the fourth and fifth forward speed ranges.

Figure 4:
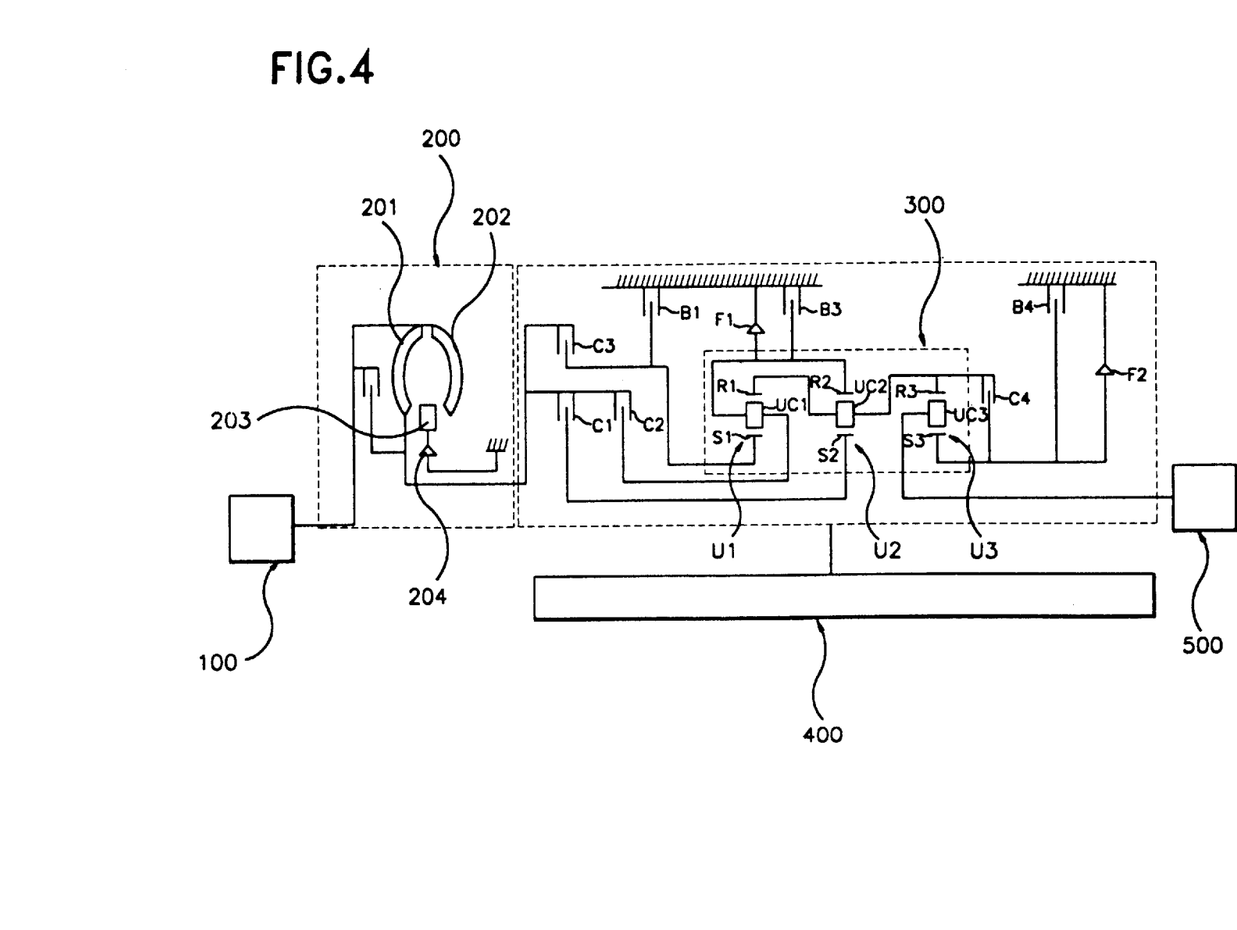

Referring now to FIG. 4, the automatic transmission according to the present invention includes: a fluid torque converter 200 connected to a crankshaft of an engine 100 which functions a starting clutch for increasing torque and rotary speed of the engine 100; a planetary gear unit 300 installed next to the fluid torque converter 200 for changing the torque and the rotary speed transferred from the fluid torque converter 200 and converting the rotary direction thereof; friction elements for driving selectively the components of the planetary gear unit 300 or for connecting or locking them to driving shafts; a hydraulic control system 400 for controlling fluid pressure manually or automatically by complying the friction elements C, B & F with the vehicle speed or the drive condition; and a shift lever (not shown) for selecting the mode such as parking, reverse and forward speed ranges. There is also shown in FIG. 4 a driven reduction gear unit 500.

The fluid torque converter 200 includes: a pump impeller 201, a turbine runner 202, and a stator 203. The pump impeller 201 is driven by a crankshaft of the engine. The turbine runner 202 is installed in an input shaft of the transmission. The stator 203 is installed through an one-way clutch 204 in the housing H. The fluid torque converter is filled with oil.

Moreover, the planetary gear unit 300 is composed of the first planetary gear set U1, the second planetary gear set U2, and the third planetary gear set U3 which are placed in parallel from one another. Each of the planetary gear sets U1, U2, and U3 includes: a sun gear S, a ring gear R, and a planetary carrier UC.

The friction elements include at least four clutches C1, C2, C3, and C4 for selectively connecting or disconnecting the flow of the power which is transferred to each planetary gear set from the fluid torque converter 200, at least three brakes B1, B3 and B4 for locking planetary gear sets U1, U2 and U3, and two one-way clutches F1 and F2 for rotating any one component of the planetary gear sets in one predetermined direction.

Preferably, the first clutch C1 is installed so as to connect or disconnect the flow of the power to the sun gear S2 of the second planetary gear set (hereinafter referred as "second sun gear S2"). The second clutch C2 is installed so as to connect or disconnect the flow of the power to the planetary carrier UC1 of the first planetary gear set U1 (hereinafter referred to as "first carrier UC1"). The fourth clutch C4 is installed so as to connect or disconnect the flow of the power from the third ring gear R3 to the third sun gear S3.

Furthermore, the first brake B1 is installed so as to brake or lock the first sun gear S1 in relation to the housing. The second brake B3 is installed so as to lock the first planetary carrier UC1 in relation to the housing. The third brake B4 is installed so as to lock the third sun gear S3 in relation to the housing.

The first one-way clutch F1 is installed so as to prevent the second ring gear R2 from rotating in the reverse direction. The second one-way clutch F2 is installed so as to prevent the third sun gear S3 from rotating in the reverse direction.

Furthermore, the arrangement and the number of the friction elements are not limited to the embodiment shown in the drawings. It will appear to those ordinarily skilled in the art that various modifications may be made. For instance, the friction elements are operated by fluid pressure applied from the hydraulic control system, and may drive the components of each planetary gear set and otherwise connect or lock them to the driven shafts.

In the automatic transmission according to the present invention, the rotary speed and torque, that is, the power of the engine is increased during passing through the fluid torque converter, and such power of the engine is then changed by the selective operating of the friction elements which is controlled by the hydraulic control system. Moreover, the rotary speed is changed by operating of each planetary gear set and transferred to the output shaft. The rotational direction of the output shaft can also be changed.

The power flow according to the shift process and the range change will be described with reference to FIG. 5 to FIG. 10 in detail.

1. R Range (Reverse Speed Range)

Figure 5:
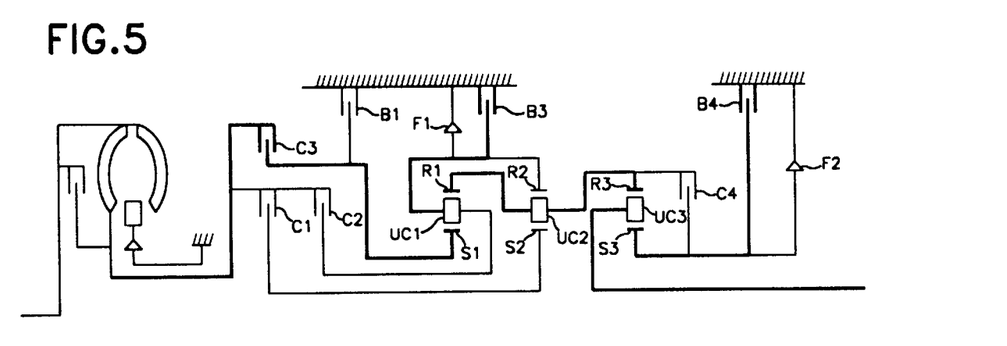
FIG. 5 shows the state at the time of the speed shift.

In the reverse speed range, the third clutch C3, the second brake B3, and the third brake B4 are synchronously operated, as shown at FIG. 5. Therefore, the power is inputted to the sun gear S1 of the first planetary gear set U1 through the third clutch C3 from the torque converter, and is then outputted with a reduction in speed through the ring gear R1 because the first planetary carrier UC1 is locked by the second brake B3. At this time, the power is outputted with the change in the rotational direction. The power outputted through the first ring gear R1 with the reverse rotational direction is inputted to the third ring gear R3 of the third planetary gear set U3 through the second planetary carrier UC2 and is then outputted to the output shaft through the planetary carrier UC3 from the sun gear S3 being locked by the third brake B4.

2. D Range (First Forward Speed Range)

Figure 6:
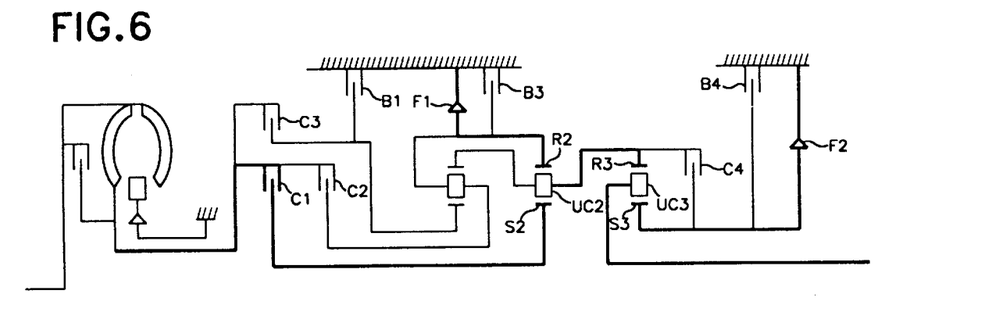
FIG. 6 shows the state at the time of the first speed shift.

In this range, the first clutch C1, the first one-way clutch F1, and the second one-way clutch F2 are synchronously operated, as shown at FIG. 6. Therefore, the power is inputted to the second sun gear S2 through the first clutch C1 from the torque converter, and is then outputted with a reduction in speed through the second planetary carrier UC2 because the second ring gear R2 is locked by the first one-way clutch F1.

The power outputted in such a path is inputted to the third ring gear R3 and is then outputted to the output shaft through the third planetary carrier UC3 because the third sun gear S3 is locked by the second one-way clutch F2. According to this operation, the engine power is transferred to the output shaft with a reduction in speed.

3. D Range (Second Forward Speed Range)

Figure 7:
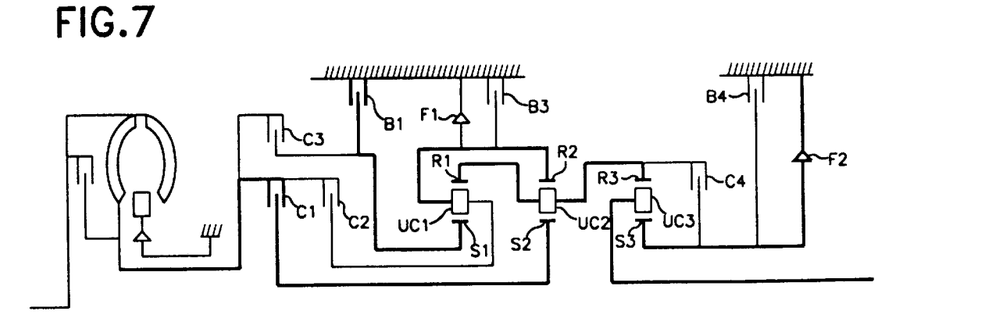
FIG. 7 shows the state at the time of the second speed shift.

In this range, the first clutch C1, the first brake B1 and the second one-way clutch F2 are operated synchronously, as shown at FIG. 7. Therefore, the power is inputted to the second sun gear S2 through the first clutch C1.

The power inputted in such a path is transferred to a first ring gear R1 through a planetary carrier UC2 from the torque converter without a reduction or an increase in speed, because the second ring gear R2 is idled. This power is inputted to the second ring gear R2 with a reduction in speed through the planetary carrier UC1 because the first sun gear S1 is locked by the first brake B1, and is also inputted to the second sun gear S2. Therefore, the power outputted with a reduction in speed at the first planetary gear set U1 is inputted to the third ring gear R3 through the planetary carrier UC2. The power inputted to the third ring gear R3 in this way is outputted to output shaft through the third planetary carrier UC3 with a reduction in speed once again because the third sun gear S3 is locked by the second one-way clutch F2.

4. D Range (Third Forward Speed Range)

Figure 8:
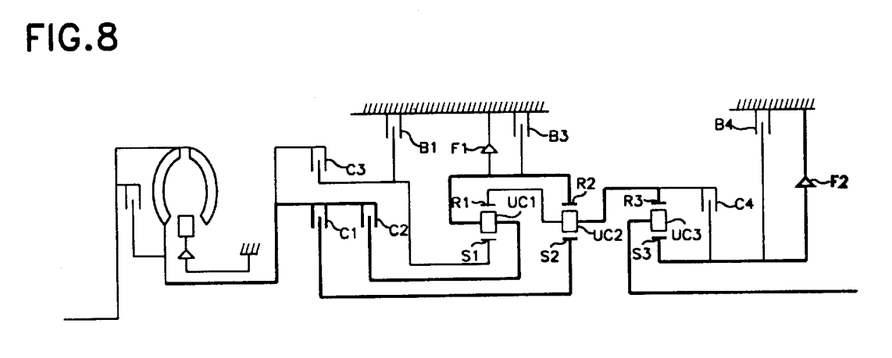
FIG. 8 shows the state at the time of the third speed shift.

In this range, a first clutch C1, the second clutch C2, and the second one-way clutch F2 are operated synchronously, as shown in FIG. 8. The power is inputted to the second sun gear S2 through the first clutch C1 and the at the same time, to the first planetary carrier UC1 through the second clutch C2. The power inputted to the planetary carrier UC1 of the first planetary gear set U1 is then inputted to the second ring gear R2 through the planetary carrier UC1, since the first sun gear S1 and the first ring gear R1 are idled. At this time, the power is outputted through the planetary carrier UC2 because the power is inputted to the second sun gear S2 through the first clutch C1. The power outputted in such manner is inputted to the third ring gear R3. Here, as the third sun gear S3 is locked by the second one-way clutch F2, the power with a reduction in speed is transferred to the output shaft through the third planetary carrier UC3. Therefore, the underdrive condition wherein the gear ratio is above one is accomplished.

5. D Range (Fourth Forward Speed Clutch)

Figure 9:
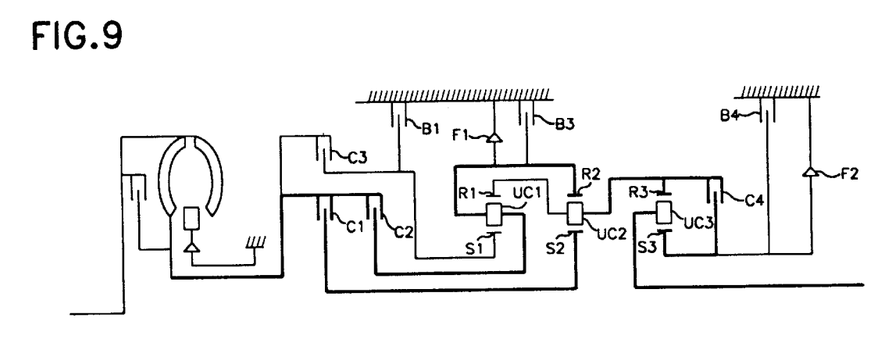
FIG. 9 shows the state at the time of the fourth speed shift.

In this range, the first clutch C1, the second clutch C2, and the fourth clutch C4 are operated synchronously, as shown at FIG. 9. Therefore, the power is inputted to the second sun gear S2 through the first clutch C1 and is also inputted to the first planetary carrier UC1 through the second clutch C2. Here, the power inputted to the first planetary carrier UC1 is outputted without any speed change because the first sun gear S1 and first ring gear R1 are idled. The power is then inputted to the second ring gear R2. At this time, the power is also inputted to the second sun gear S2 through the first clutch C1, such that the power is outputted through the planetary carrier UC2 without any speed change. The power is then inputted to the ring gear R3 of the third planetary gear set U3. Here, as the fourth clutch C4 is in the operative state, the third ring gear R3 and the third sun gear S3 are synchronously rotated at the same speed. Therefore, the planetary carrier UC3 engaged with the third ring gear R3 and the third sun gear S3 is rotated at the same speed. Therefore, the total components of the third planetary gear are rotated in the same direction. In other words, as the power is inputted to the third ring gear R3 and the third sun gear S3 and is then outputted through the third planetary carrier UC3, the power outputted from the second planetary gear set U2 is transferred to the output shaft without any change. Therefore, the rotational speed transferred from the engine is transferred without any change, so the vehicle can run at high speed.

6. D Range (Fifth Forward Speed Range)

Figure 10:
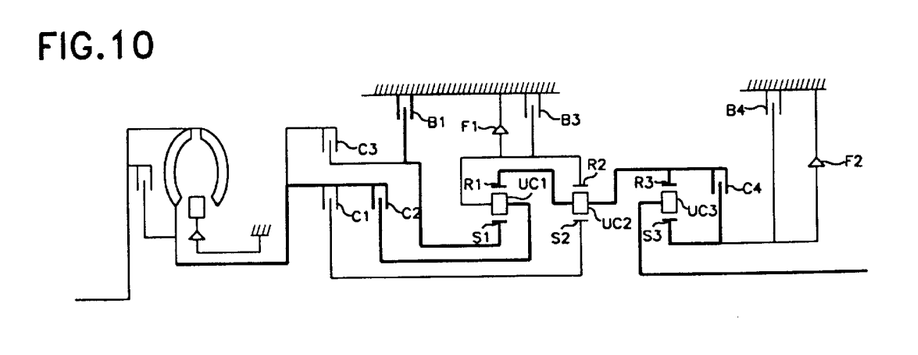
FIG. 10 shows the state at the time of the fifth speed shift.

In this range, the second clutch C2 and the fourth clutch C4 are operated synchronously, and the first sun gear S1 is locked by the first brake B1, as shown at FIG. 10. Therefore, the power is inputted to the first planetary carrier UC1 through the second clutch C2 from the torque converter. As the first sun gear S1 is locked by the first brake B1, the power which is outputted through the ring gear R1 is inputted to the third ring gear R3 via the second planetary carrier UC2.

Herein the power with an increase in speed at the first planetary gear set U1 is transferred to the third ring gear R3 without any increase or decrease in speed, since the second sun gear S2 and the second ring gear are idled.

Moreover, as the third ring gear R3 is engaged with the third sun gear S3 by the fourth clutch C4, the power is inputted by the third ring gear R3 and the third sun gear S3 and is outputted through the third planetary carrier UC3. This means direct coupling of the third planetary gear set U3. Thus as the power with an increase in speed at the first planetary gear set U1 is transferred to the output shaft through the third planetary gear set U3 without any speed change, the output shaft may be driven at the highest speed in the overdrive state in which the gear ratio is below 1.

7. N Range (Neutral) and P Range (Parking)

The detailed flow chart of power in this range is omitted. In this range, all of the friction elements are unlocked, and the constituent elements comprising the planetary gear set such as the sun gear, the ring gear and the planetary carrier can rotate unrestrictedly. Therefore, the power of the input shaft is not transferred to the output shaft, and the engine is idled.

As the shift lever is changed to P in the parking, a parking hole is fitted to the outer gear wheel of the oil distributor and the output shaft is locked mechanically. In addition, the reverse planetary carrier is locked by the low and reverse brake.

The operation relation of the friction elements according to each shift range described above, is shown in the following Table 1. The example of gear ratio in each speed range is shown. For the following tables, UD is an abbreviation for the term underdrive, OD is an abbreviation for the term overdrive, and DC indicates direct coupling. The minus sign − indicates reverse direction, and O indicates that the relevant element is in operation.

TABLE 1

| SHIFT POSITION | U1 U2 | U3 | C1 | C2 | C3 | C4 | B1 | B3 | B4 | F1 | F2 |
|---|---|---|---|---|---|---|---|---|---|---|---|
| P | | | | | | | | | | | |
| R | −UD | UD | | | O | | | O | O | | |
| N | | | | | | | | | | | |
| D1 | UD | UD | O | | | | | | | O | O |
| D2 | UD | UD | O | | | | O | | | | O |
| D3 | DC | UD | O | O | | | | | | | O |
| D4 | DC | DC | O | O | O | | | | | | |
| D5 | OD | DC | | O | | O | O | | | | |

TABLE 2

| SHIFT POSITION | GEAR RATIO (A*B) | U1 + U2 GEAR RATIO (A) | | U3 GEAR RATIO (B) | |
|---|---|---|---|---|---|
| D1 | 3.960 | 2.890 | UD | 1.37 | UD |
| D2 | 2.170 | 1.581 | UD | 1.37 | UD |
| D3 | 1.370 | 1.000 | DC | 1.37 | UD |
| D4 | 1.000 | 1.000 | DC | 1.00 | DC |
| D5 | 0.690 | 0.690 | OD | 1.00 | DC |
| R | −3.096 | −2.260 | −UD | 1.37 | UD |

FIGS. 11 to 16 show the power flows by shifting the automatic transmission having five forward speed ranges and a single reverse speed range according to another embodiment of the present invention. As shown in these drawings, in this embodiment, the basic structure is similar to the aforementioned embodiment. In this embodiment, however, the third planetary gear set U3 may be constructed so that the input power is transferred to the output shaft without any change in speed in the forward fifth speed range only.

The power flow by shifting the automatic transmission according to this embodiment is as follows:

1. R Range (Reverse Speed Range)

Figure 11:
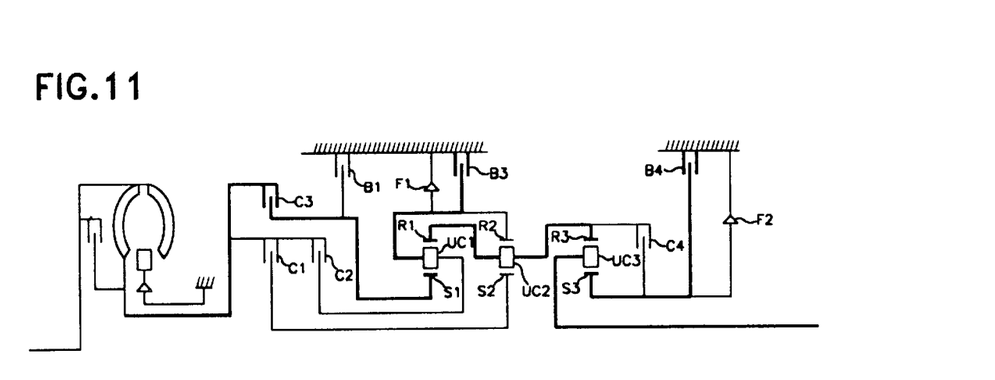
FIG. 11 shows the state at the time of the speed shift.

In this range, the third clutch C3, the second brake B3, and the third brake B4 are synchronously operated, as shown at FIG. 11. Therefore, the power is inputted to the first sun gear S1 through the third clutch C3 from the torque converter, and is then outputted with a reduction in speed through the ring gear R1 because the first planetary carrier UC1 is locked by the second brake B3. At this time, the power is outputted with change in the rotational direction.

The power outputted through the first ring gear R1 with reverse rotational direction is inputted to the third ring gear R3 through the second planetary carrier UC2 and is then outputted to the output shaft through the third planetary carrier UC3 because the third sun gear S3 is locked. According to this operation, the vehicle moves in reverse.

2. D Range (First Forward Speed Range)

Figure 12:
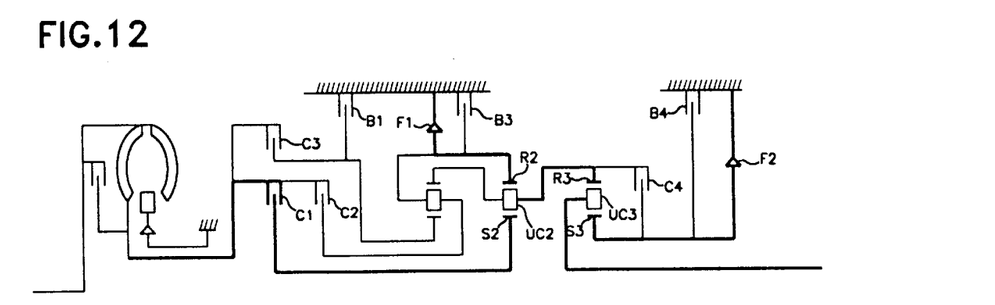
FIG. 12 shows the state at the time of the first speed shift.

In this range, the first clutch C1, the first one-way clutch F1, and the second one-way clutch F2 are synchronously operated as shown at FIG. 12. Therefore, the power is inputted to the second sun gear S2 and is then outputted with a reduction in speed through the planetary carrier UC2 from the second ring gear R2 being locked by the first one-way clutch F1.

The power outputted in such a path is inputted to the third ring gear R3 and is then outputted to the third output shaft through the third planetary carrier UC3 from the third sun gear S3 being locked by the second one-way clutch F2. According to this operation, the engine power is transferred to the output shaft with a reduction in speed.

3. D Range (Second Forward Speed Range)

Figure 13:
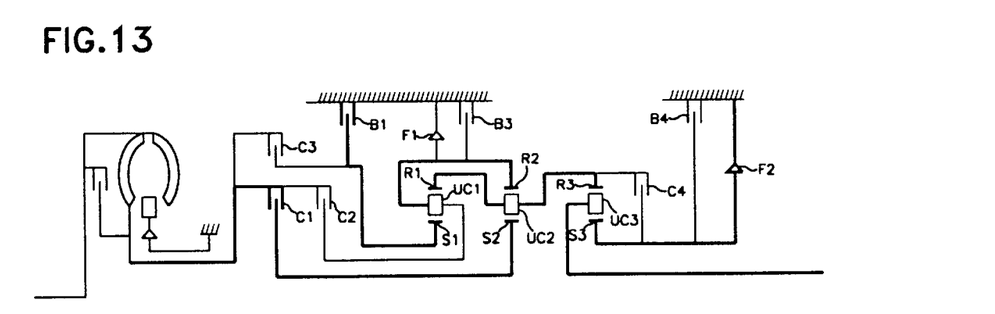
FIG. 13 shows the state at the time of the second speed shift.

In this range, the first clutch C1, the first brake B1, and the second one-way clutch F2 are synchronously operated, as shown at FIG. 13. Therefore, the power is inputted to the second sun gear S2 through the first clutch C1, and is then outputted without any increase or reduction in speed to the ring gear R1 of the first planetary gear set U1 through the planetary carrier UC2 from the second ring gear R2 being idled.

The power outputted in such a path is inputted to the second ring gear R2 with a reduction in speed through the first planetary carrier UC1 as the first sun gear S1 is locked by the first brake B1. At this time, the power is also inputted to the second sun gear S2 so that the power outputted with a reduction in speed at the first planetary gear set U1 is inputted to the third ring gear R3 through the second planetary carrier UC2. Such power inputted to the third ring gear R3 is transferred to the output shaft through the planetary carrier UC3 with a reduction in speed once again as the third sun gear S3 is locked by the second one-way clutch F2.

4. D Range (Third Forward Speed Range)

Figure 14:
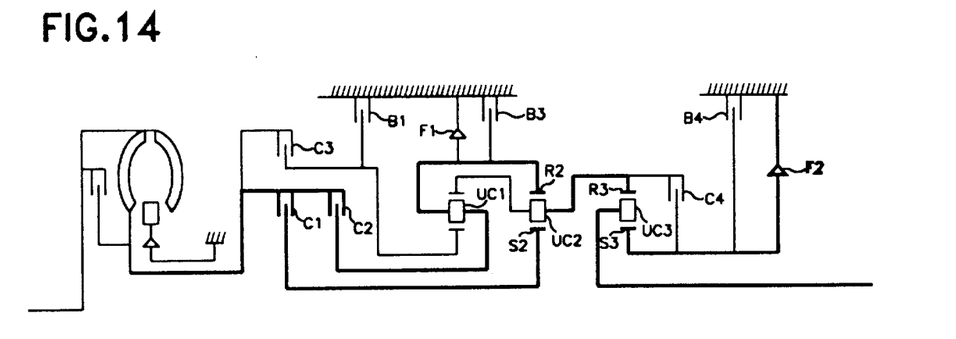
FIG. 14 shows the state at the time of the third speed shift.

In this range, a first clutch C1, a second clutch C2, and a second one-way clutch F2 are operated synchronously, as shown at FIG. 14. The power is inputted to the second sun gear S2 through the first clutch C1 and is also inputted, at the same time, to the first planetary carrier UC1 through the second clutch C2. The power inputted to the planetary carrier UC1 is inputted to the second ring gear R2 through the planetary carrier UC1 because the first sun gear S1 and the first ring gear R1 are idled. At this time, the power is inputted to the second sun gear S2 through the first clutch C1 so that the inputted power is outputted through the second planetary gear set at the same speed as in the first planetary gear set. The power, outputted in such a manner is inputted to the third ring gear R3. Here, as the third sun gear S3 is locked by the second one-way clutch F2, the power, with a reduction in speed, is transferred to the output shaft through the planetary carrier UC3. Therefore, the underdrive condition wherein the gear ratio is above one is accomplished.

5. D Range (Fourth Forward Speed Range)

Figure 15:
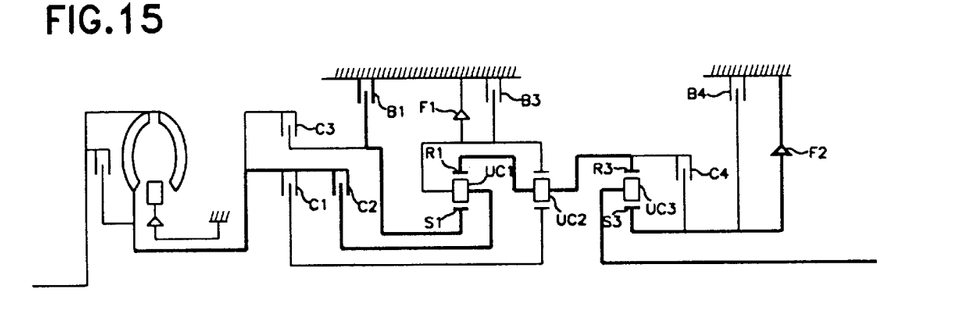
FIG. 15 shows the state at the time of the fourth speed shift.

In this range, the second clutch C2, the first brake B1, and the second one-way clutch F2 are operated synchronously, as shown in FIG. 15. Therefore, the power is inputted to the first planetary carrier UC1 through the second clutch C1. The power inputted in such a manner is outputted with an increase in speed, through the first ring gear R1 as the first sun gear S1 is locked by the first brake B1. The power outputted with the increase in speed through the ring gear R1 is inputted to the third ring gear R3 through the second planetary carrier UC2 which is idled. The power inputted in such a manner is transferred to the output shaft with a reduction in speed through the third planetary carrier UC3 as the third sun gear S3 is locked by the second one-way clutch F2.

6. D Range (Fifth Forward Speed Range)

Figure 16:
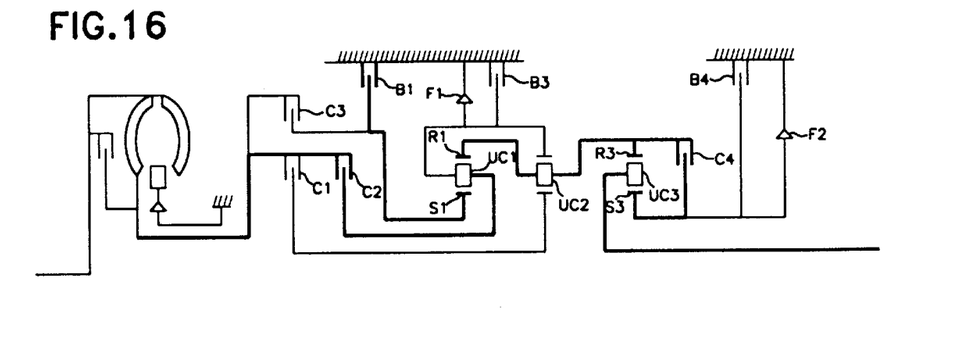
FIG. 16 shows the state at the time of the fifth speed shift.

In this range, the second clutch C2 and the fourth clutch C4 are operated synchronously, as shown in FIG. 16. Furthermore, the first sun gear S1 is locked by the first brake B1. Therefore, the power is inputted to the first planetary carrier UC1 through the second clutch C2. As the first sun gear S1 by the first brake B1, the power with an increase in speed is outputted to the first ring gear R1. The power outputted in such a manner is inputted to the third ring gear R3 through the second planetary carrier UC2. Here, as the second sun gear S2 and the second ring gear R2 are idled, the power with an increase in speed at the first planetary gear set U1 is transferred without any increase in speed at the first planetary gear set U1 is transferred without any increase or decrease in speed to the third ring gear R3. Here, as the ring gear R3 is in the engagement with the third sun gear S3 due to the operation of the fourth clutch C4, the power is ultimately inputted through both the third ring gear R3 and the third sun gear S3. The input power is then outputted through the third planetary carrier UC3. The highest speed in the overdrive condition having the gear ratio below one is accomplished, because the input power with an increase in speed at the first planetary gear set is transferred to the output shaft without any increase or decrease in speed through the third planetary gear set U3.

7. N Range (Neutral) and P Range (Parking)

The detailed power flow chart in this range will be omitted. In this range, all friction elements are in the non-operation situation, so that all of the planetary gear sets are idled. Therefore, the power from the input shaft is not transferred to the output shaft. In other words, the engine is in the idle condition. In the parking range, if the operator selects the shift lever as in the Parking range, the teethed wheel at the outside of an oil distributor is inserted into the parking hole, and the output shaft is mechanically locked. Moreover, the rear planetary carrier is locked by the low and reverse brake.

TABLE 3

| SHIFT POSITION | U1 U2 | U3 | C1 | C2 | C3 | C4 | B1 | B3 | B4 | F1 | F2 |
|---|---|---|---|---|---|---|---|---|---|---|---|
| P | | | | | | | | | | | |
| R | −UD | UD | | | O | | | O | O | | |
| N | | | | | | | | | | | |
| D1 | UD | UD | O | | | | | | | O | O |
| D2 | UD | UD | O | | | | O | | | | O |
| D3 | DC | UD | O | O | | | | | | | O |
| D4 | OD | OD | | O | | O | | | | | O |
| D5 | OD | DC | | O | | O | O | | | | |

TABLE 4

| SHIFT POSITION | GEAR RATIO (A*B) | U1 + U2 GEAR RATIO (A) | | U3 GEAR RATIO (B) | |
|---|---|---|---|---|---|
| D1 | 3.960 | 2.890 | UD | 1.37 | UD |
| D2 | 2.170 | 1.581 | UD | 1.37 | UD |

TABLE 4-continued

| SHIFT POSITION | GEAR RATIO (A*B) | U1 + U2 GEAR RATIO (A) | | U3 GEAR RATIO (B) | |
|---|---|---|---|---|---|
| D3 | 1.370 | 1.000 | DC | 1.37 | UD |
| D4 | 1.000 | 1.000 | OD | 1.37 | UD |
| D5 | 0.690 | 0.690 | OD | 1.00 | DC |
| R | −3.096 | −2.260 | −UD | 1.37 | UD |

FIGS. 17 to 22 show the power flows by shifting the automatic transmission having 5 gear ratios according to yet another embodiment of the present invention. Wherein the basic structure is similar to that of the aforementioned embodiments. In this embodiment, the inputted power is transferred to the output shaft in the third, the fourth and the fifth speed ranges without any speed change, while passing through the third planetary gear set U3.

The power by shifting the automatic transmission according to this embodiment is as follows:

1. R Range (Reverse Speed Range)

Figure 17:
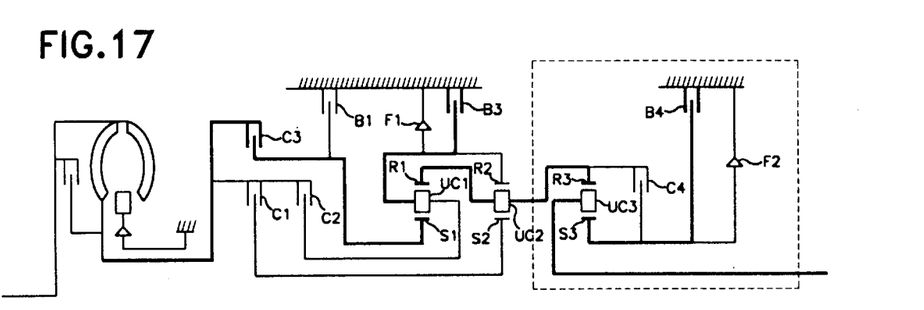
FIG. 17 shows the state at the time of the reverse speed shift.

In this range, the third clutch C3, the second brake B3 and the third brake B4 are operated synchronously, as shown at FIG. 17. Therefore, the power is inputted to the first sun gear S1, and is then reduced during passing through the first ring gear R1 because the carrier UC1 is locked by the second brake B3. Finally, the power is outputted to the second planetary gear set U2.

When the power is outputted to the second planetary gear set U2, the rotational direction thereof is reversed. The power in reverse rotational direction is transferred to the third ring gear R3 through the second carrier UC2 and is then outputted to the output shaft through the second carrier UC2 from third sun gear S3 being locked.

2. D Range (First Forward Speed Range)

Figure 18:
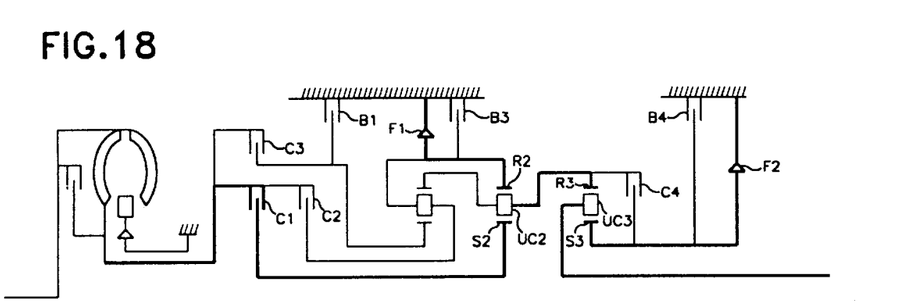
FIG. 18 shows the state at the time of the first speed shift.

In this range, the first clutch C1, the first one-way clutch F1 and the second one-way clutch F2 are operated synchronously, as shown in FIG. 18. Therefore, the power is inputted to the second sun gear S2 and is then reduced during passing through the second carrier UC2 from the second ring gear R2 being locked by the first one-way clutch F1. Finally, the power is outputted from the first carrier UC1 to the third ring gear R3.

The output power is then transferred to the output shaft through the third carrier UC3 from the third sun gear S3 being locked by the second one-way clutch F2. In this range, the power generated in the engine is reduced in the manner as described above.

3. D Range (Second Forward Speed Range)

Figure 19:
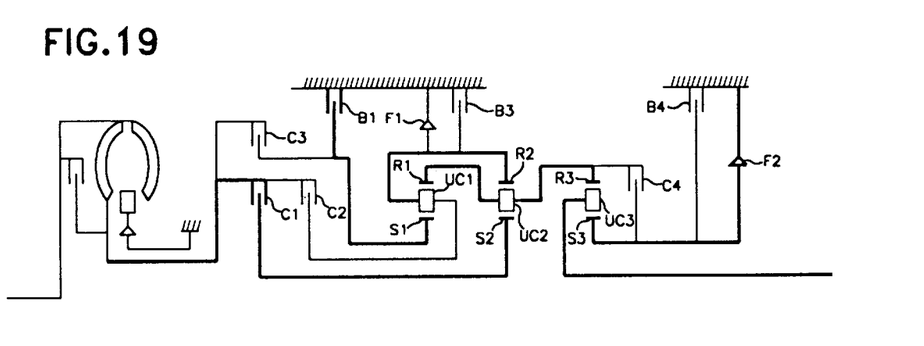
FIG. 19 shows the state at the time of the second speed shift.

In this range, the first clutch C1, the first brake B1, and the second one-way clutch F2 are operated synchronously, as shown at FIG. 19. Therefore, the power is inputted to the second sun gear S2 through the first clutch C1, and is then outputted to the first ring gear R1 through the second carrier UC2 without any speed change from the second ring gear R2 being idled.

In addition, because the first sun gear S1 is locked by the first brake B1, the power inputted to the first ring gear R1 is reduced in the first planetary gear set U1 and the power is inputted to the second ring gear R2 through the carrier UC1. Furthermore, because the power is inputted continuously to the second sun gear S2, the power reduced in the first planetary gear set U1 is inputted to the third ring gear R3 through the carrier UC2. The third sun gear S3 is locked by the second one-way clutch F2, whereby the power inputted to the third ring gear R3 is further reduced and then transferred to the output shaft through the third carrier UC3.

4. D Range (Third Forward Speed Range)

Figure 20:
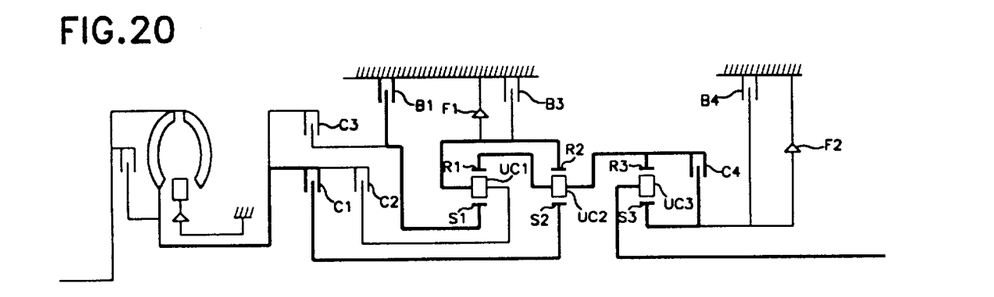
FIG. 20 shows the state at the time of the third speed shift.

In this range, the first clutch C1, the first brake B1, and the fourth clutch C4 are operated synchronously, as shown in FIG. 20. Therefore, the power is inputted to the second sun gear S2 through the first clutch C1, and is the outputted to the first ring gear R1 through the second carrier UC2 without any change in speed from the second ring gear R2 being idled.

In addition, because the first sun gear S1 is locked by the first brake B1, the power inputted to the first ring gear R1 is reduced in the first planetary gear set U1 and the power is then inputted to the second ring gear R2 through the carrier UC1. Furthermore, because the power is also inputted continuously to the second sun gear S2, the power reduced in the first planetary gear set U1 is inputted to the third ring gear R3 through the second carrier UC2. Here, the third ring gear R3 is engaged with the third sun gear S3 by operation of the fourth clutch C4. As a result, the power is inputted to the third ring gear R3 through the sun gear S3, and is then outputted through the third carrier UC3.

By transferring power as described above, when the power passes through the planetary gear sets, the planetary gear sets rotate in single body, so that the power can be transferred to the output shaft through the third carrier UC3 without any reduction in speed. Therefore, the velocity of the vehicle in the third forward speed range is able to be faster than in the first and second forward speed ranges.

5. D Range (Fourth Forward Speed Range)

Figure 21:
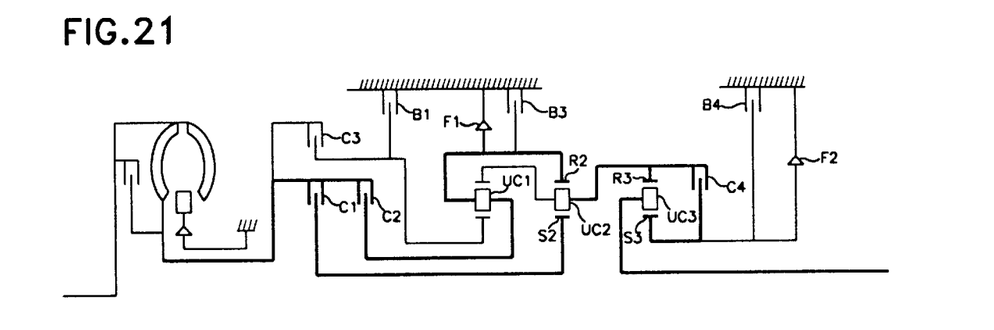
FIG. 21 shows the state at the time of the fourth speed shift.

In this range, the first clutch C1, the second clutch C2, and the fourth clutch C4 are operated synchronously, as shown in FIG. 21. Therefore, the power is inputted to the second sun gear S2 of the second planetary gear set U2 through the first clutch C1, and the power is also inputted to the first carrier UC1 through the second clutch C2.

The power inputted to the first carrier UC1 is outputted to the second ring gear R2 without any change from the first ring gear R1 and the second sun gear S2 being idled. The power is also inputted to the second sun gear S2 through the first clutch C1, so that the second planetary gear set U2 is held to ratio of 1 and is outputted to the third ring gear R3 through the second carrier UC2.

As described above, the third ring gear R3 is engaged to the third sun gear S3 by the operation of the fourth clutch C4 so that the power can be inputted to the third ring gear R3 via the third sun gear S3. The power inputted to the third ring gear R3 is outputted to the output shaft through the first carrier UC1. The planetary gear sets rotate in single body, that is, the power inputted to the third ring gear R3 and the third sun gear S3 is outputted to the output from the second planetary gear set U2 can be transferred to the output shaft without any speed change. In this speed range, the vehicle is able to run at high speed coinciding with the RPM of the engine from the power being able to be transferred to the output shaft without any change.

6. D Range (Fifth Forward Speed Range)

Figure 22:
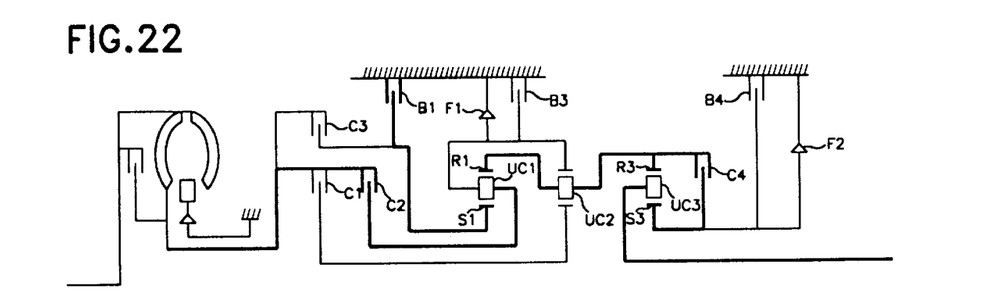
FIG. 22 shows the state at the time of the fifth speed shift.

In this range, the second clutch C2, and the fourth clutch C4 are operated synchronously and the first sun gear S1 is locked by the first brake B1, as shown at FIG. 22. Therefore, the power is inputted to the first carrier UC1 through the second clutch C2.

Since the first sun gear S1 is locked by the first brake B1, the power is increased and is then outputted to the ring gear R1. The power outputted to the first ring gear R1 is inputted to the third ring gear R3 of the third planetary gear set U3 through the second planetary carrier UC2. Here, as the second ring gear R2 and the second sun gear S2 are idled, the power having the speed increased in the first planetary gear set U1 pass through the second planetary gear set U2 without any increase or decrease in speed, and is then transferred to the third ring gear R3.

The second sun gear S2 and the third ring gear R3 are engaged together and rotate in the same direction, so the second carrier UC2 engaged with gears R3 and S3 is rotated in 1:1 ratio with respect to rotation of these gears R3 and S3. In other words, the power is inputted to both the second sun gear S2 and the third ring gear R3 in two paths and is outputted to the output shaft through the second carrier UC2 in one path. Therefore, the power with an increase in speed at the first planetary gear set U1 can be outputted to the output shaft through the third planetary gear set U3 without any change in speed, whereby the vehicle can run at high speed in overdrive state with the gear ratio below 1.

7. N range (neutral) and P range (parking)

The drawings showing power flows of these ranges are omitted. In the N range, none of the friction elements are operated. Therefore the sun gears, the ring gears and the carrier of the planetary gear sets are idled whereby the power generated from the engine cannot be transferred to the output shaft. The engine is therefore is an idle state. On the other hand, in the P range, an out gear wheel of an oil distributor is inserted into a parking hole and the output shaft is locked mechanically. In addition, a low and reverse brake is operated to lock the carriers of the planetary gear sets.

As described above, each interrelation of all friction elements and each gear ratio in this embodiment is illustrated in the following tables.

TABLE 5

| SHIFT POSITION | U1 U2 | U3 | C1 | C2 | C3 | C4 | B1 | B3 | B4 | F1 | F2 |
|---|---|---|---|---|---|---|---|---|---|---|---|
| P | | | | | | | | | | | |
| R | −UD | UD | | | O | | | O | O | | |
| N | | | | | | | | | | | |
| D1 | UD | UD | O | | | | | | | O | O |
| D2 | UD | UD | O | | | | | O | | | O |
| D3 | UD | DC | O | | | O | O | | | | |
| D4 | DC | DC | O | O | | O | | | | | |
| D5 | OD | DC | | O | | O | O | | | | |

TABLE 6

| SHIFT POSITION | GEAR RATIO (A*B) | U1 + U2 GEAR RATIO (A) | | U3 GEAR RATIO (B) | |
|---|---|---|---|---|---|
| D1 | 3.960 | 2.890 | UD | 1.37 | UD |
| D2 | 2.170 | 1.581 | UD | 1.37 | UD |
| D3 | 1.370 | 1.000 | DC | 1.00 | DC |
| D4 | 1.000 | 1.000 | DC | 1.00 | DC |
| D5 | 0.690 | 0.690 | OD | 1.00 | DC |
| R | −3.096 | −2.260 | −UD | 1.37 | UD |

Therefore, according to the automatic transmission as described above, the rotary torque and the rotary speed of the engine is increased through the fluid torque converter, and the increased power of the engine is transferred to the output shaft with any change in speed or in rotational direction while passing through each planetary gear set. At this time, in D range the first forward speed range to the five forward speed range is shifted gradually. In other words, the increase of the gear ratio in first forward speed range compared to the conventional automatic transmission increases driving force. Therefore, the starting acceleration is improved.

Moreover, the smooth connection at the shift is accomplished by the gradual shifting and the fuel consumption is reduced as a result. Compared with the conventional automatic transmission, the shift shock is reduced, along with noise and vibration, from the small fluctuation width of the driving force that results from the shift range being subdivided into five speed steps or ranges.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A vehicle automatic transmission having five forward speed ranges and a single reverse speed range, comprising:
    a fluid torque converter connected to a crankshaft of an engine and having the function of a starting clutch and for increasing the rotary torque of the engine and transferring the increased rotary torque;
    a planetary gear unit including a first planetary gear set, a second planetary gear set and a third planetary gear set, for changing the rotary torque and the rotary speed of the power from the fluid torque converter and converting the rotational direction of the power from the fluid torque converter, and installed next to the fluid torque converter;
    friction elements for driving the gears of each planetary gear set in the planetary gear unit to connect and lock the planetary gear sets to driven shafts; and
    a hydraulic control system for operating the friction elements by converting fluid pressure according to a speed of the vehicle and a vehicle driving condition, wherein the third planetary gear set is constructed such that the rotary torque and the rotary speed thereof are unaffected by the third planetary gear set in the third forward speed range, the fourth forward speed range and the fifth forward speed range.

2. A vehicle automatic transmission having five forward speed ranges and a single reverse speed range, comprising:
    a fluid torque converter connected to a crankshaft of an engine and having the function of a starting clutch and for increasing the rotary torque of the engine and transferring the increased rotary torque;
    a planetary gear unit including a first planetary gear set, a second planetary gear set and a third planetary gear set, for changing the rotary torque and the rotary speed of the power from the fluid torque converter and converting the rotational direction of the power from the fluid torque converter, and installed next to the fluid torque converter;
    friction elements for driving the gears of each planetary gear set in the planetary gear unit to connect and lock the planetary gear sets to driven shafts; and
    a hydraulic control system for operating the friction elements by converting fluid pressure according to a speed of the vehicle and a vehicle driving condition, further comprising brakes for locking components of each planetary gear set and two one-way clutches for rotating the components of each planetary gear set in one predetermined direction only, wherein the first of four clutches comprises the friction elements and is installed so as to connect and disconnect the flow of power of a sun gear of the second planetary gear set, the second clutch is installed so as to connect and disconnect the flow of power of a planetary carrier of the first planetary gear set, the third clutch is installed so as to connect and disconnect the flow of power of a sun gear of the first planetary gear set, and the fourth clutch is installed so as to connect and disconnect the flow of power from a ring gear to a sun gear of the third planetary gear set.

3. The automatic transmission as claimed in claim 2, wherein, one of said brakes is installed in relation to a housing so as to lock the sun gear of the first planetary gear set, a second said brake is installed in relation to the housing so as to lock the planetary carrier of the first planetary gear set, and a third brake is installed in relation to the housing so as to lock the sun gear of the third planetary gear set.

4. The automatic transmission as claimed in claim 2, wherein one of the one-way clutches is installed so as to prevent a ring gear of the second planetary gear set from rotating in the reverse direction, and a second of the one-way clutches is installed so as not to rotate the sun gear of the third planetary gear set in the reverse direction.

* * * * *